(12) United States Patent
Couch et al.

(10) Patent No.: US 6,604,096 B1
(45) Date of Patent: Aug. 5, 2003

(54) APPARATUS AND METHOD FOR LOCALLY CACHING QUERY EXPLAIN DATA

(75) Inventors: Tanya Couch, San Jose, CA (US); Catherine Elizabeth Wuebker Drummond, Morgan Hill, CA (US); Virginia Walbridge Hughes, Jr., Hollister, CA (US); Theresa Hsing Lai, Saratoga, CA (US); Joseph Davis Lea, III, Chapel Hill, NC (US); David Harold Oberstadt, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/482,417

(22) Filed: Jan. 13, 2000

Related U.S. Application Data

(63) Continuation-in-part of application No. 08/949,636, filed on Oct. 14, 1997, now Pat. No. 6,243,703.

(51) Int. Cl.[7] .............................................. G06F 17/30
(52) U.S. Cl. ................................ 707/2; 707/4; 707/10; 707/104.1
(58) Field of Search ........................ 707/1–10; 709/217, 709/218, 219

(56) References Cited

U.S. PATENT DOCUMENTS

| | | | | |
|---|---|---|---|---|
| 5,315,504 A | | 5/1994 | Lemble | 364/400 |
| 5,367,675 A | | 11/1994 | Cheng et al. | 395/600 |
| 5,379,419 A | * | 1/1995 | Heffernan et al. | 707/4 |
| 5,717,924 A | | 2/1998 | Kawai | 395/613 |
| 5,734,884 A | * | 3/1998 | Eberhard et al. | 707/2 |
| 5,764,973 A | | 6/1998 | Lunceford et al. | 395/601 |
| 5,768,578 A | * | 6/1998 | Kirk et al. | 707/104.1 |
| 5,787,416 A | * | 7/1998 | Tabb et al. | 707/2 |
| 5,806,059 A | * | 9/1998 | Tsuchida et al. | 707/2 |
| 5,884,299 A | * | 3/1999 | Ramesh et al. | 707/2 |
| 6,173,322 B1 | * | 1/2001 | Hu | 709/224 |
| 6,195,653 B1 | * | 2/2001 | Bleizeffer et al. | 707/2 |
| 6,253,208 B1 | * | 6/2001 | Wittgreffe et al. | 707/104 |
| 6,285,997 B1 | * | 9/2001 | Carey et al. | 707/4 |
| 6,397,207 B1 | * | 5/2002 | Bleizeffer et al. | 707/2 |
| 6,493,700 B2 | * | 12/2002 | Couch et al. | 707/2 |

OTHER PUBLICATIONS

Dynamic Structured Query Language Prepared Statement Cache; IBM Technical Disclosure Bulletin; col. 39, No. 2, Feb. 1996; p. 179.

* cited by examiner

*Primary Examiner*—Hosain T. Alam
*Assistant Examiner*—Anh Ly
(74) *Attorney, Agent, or Firm*—Kunzler & Associates

(57) ABSTRACT

An apparatus for dynamically generating query explain data includes a processor for executing instructions and a memory device having thereon modules of operational data and executable code for execution by the processor. The modules include a query explain program operating on a workstation. The query explain program communicates over a network with a server hosting a database system and is configured to temporarily store the query explain data received across the network from the database system in a data cache. The query explain program may be configured to automatically clear a selected portion of the data cache when the data cache reaches a user-selectable size. The user is thus allowed to determine when to clear the data cache and how much of the data cache to clear.

43 Claims, 8 Drawing Sheets

| Diagram 1 of 1        Statement: 223 | Information for Multiple Index Access | |
|---|---|---|
| [diagram: MIXScan ← Intersect ← (Intersect, IXS2); Intersect ← (Union, IXS2); Union ← IXS4] | Statistics | Current Value |
| | Prefetch: | List Prefetch |
| | Access Type: | M |
| | Page range screening: | No |
| | Column function evaluation: | Not applicable or to be decided at bind time |
| | Selection details | |
| | Indicates whether the table qualifies for page-range screening. With page-range screeening, plans scan only the partitions needed. | |

Fig. 5

APPARATUS AND METHOD FOR LOCALLY CACHING QUERY EXPLAIN DATA

RELATED APPLICATIONS

This application is a continuation-in-part of U.S. patent application Ser. No. 08/949,636, filed Oct. 14, 1997 U.S. Pat. No. 6,243,703, for "Interpreting Data Using a Graphical User Interface," which is incorporated herein by reference.

BACKGROUND OF THE INVENTION

1. Identification of Copyright

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. The Field of the Invention

The present invention relates generally to computer-implemented database systems. More specifically, the present invention relates to an apparatus and method for dynamically generating query explain data with a database system.

3. The Relevant Technology

Databases are computerized information storage and retrieval systems. Databases are managed by systems and may take the form of relational databases and hierarchical databases. A Relational Database Management System (RDBMS) is a database system which uses relational techniques for storing and retrieving data. Relational databases are organized into tables consisting of rows (tuples) and columns of data. A relational database typically includes many tables, and each table includes multiple rows and columns. The tables are conventionally stored in direct access storage devices (DASD), such as magnetic or optical disk drives, for semi-permanent storage.

Generally, users communicate with an RDBMS using a Structured Query Language (SQL) interface. The SQL interface allows users to create, manipulate, and query a database by formulating relational operations on the tables, either interactively, in batch files, or embedded in host languages such as C and COBOL. SQL has evolved into a standard language for RDBMS software and has been adopted as such by both the American National Standards Institute (ANSI) and the International Standards Organization (ISO).

The SQL standard provides that each RDBMS should respond to a particular query in the same way, regardless of the underlying database. However, the method that the RDBMS actually uses to find the requested information in the database is left to the RDBMS. Typically, the RDBMS is capable of accessing the requested data in a number of different manners. The RDBMS, therefore, attempts to select the manner that minimizes the computer time and resources (i.e. cost) for executing the query.

When the RDBMS determines how to execute the SQL statements, the set of steps created by the RDBMS for executing the SQL statements is commonly referred to as the "access path." In other words, the access path is a sequence of operations used by the RDBMS to obtain the data requested by the SQL query. Depending on the access path, an SQL statement might, for instance, search an entire table space, or it might use an index. The access path is a key to determining how well an SQL statement performs. The description of the access path is stored in a table often referred to as a "plan table," which typically stores the access path data for one or more SQL statements.

In addition to determining the access path, many databases estimate the cost (in CPU time in milliseconds or service units) for executing each SQL statement. Often, the estimated costs are stored in a table, referred to in the case of DB2® for OS/390® as a "statement table." Like the plan table, the statement table generally stores the estimated statement costs for one or more SQL statements.

Moreover, some databases store information relating to user-defined functions in a table often referred to as a "function -table." User-defined functions can be very useful in developing database applications. Accordingly, it is advantageous to have information relating to the user-defined functions in a single, convenient location.

Collectively, the above-described access path data, statement cost data, and function data are referred to herein as "explain data." The plan table, statement table, and function table are referred to herein as "explain tables." Many database systems, such as the RDBMS, provide a query explain program which is used to access the explain tables. The query explain programs are in some instances configured to provide the information, referred to herein as explain data, in a graphical manner, or in a manner otherwise readily comprehendible to a user.

While the explain data is typically generated at bind time, the explain data can also be generated dynamically in response to a user-supplied query statement. A benefit of generating the explain data dynamically, is that the user is allowed to make hypothetical investigations. That is, the user can alter the queries submitted to the database in a hypothetical setting, and quickly see the results in the access data path of changes to queries.

Conventionally, when a user desires explain data for a query, the explain data is requested in each instance from the database system. However, this can result in heavy network traffic and degrade the performance of the database system. Accordingly, what is needed is a system, method, and article of manufacture for locally caching query explain data.

SUMMARY OF THE INVENTION

The present invention solves the foregoing problems by providing a system, method, and article of manufacture for locally caching query explain data. In one aspect of the invention, an apparatus for locally caching query execution data received across a network from a database system includes a processor for executing instructions and a memory device having thereon modules of operational data and executable code for execution by the processor.

In one embodiment, the modules include a query explain program configured to operate on a workstation communicating over a network with a server hosting the database system, the query explain program further configured to receive query explain data from the database system over the network. The modules also preferably include a data cache residing on the first computer station and communicating with the query explain program, the data cache executable as an integral component of the query explain program and configured to receive and temporarily store exclusively the query explain data received from the database system over the network.

In one embodiment, a cache clearing module is also provided. Preferably, the cache clearing module is configured to automatically clear a user-selectable portion of data from the data cache when the data cache reaches a selected size.

In certain embodiments, a graphical user interface, (GUI) window accessible through the query explain program may also be provided. Preferably, the GUI window is configured to be displayed on an output device connected to the first computer station and comprises user controls for configuring the data cache. The GUI window may also comprise a manual cache clearing control configured to allow a user to manually clear the data from the data cache. Additionally, a cache size display may be provided and may be configured to display the current amount of data stored in the data cache.

A cache threshold size designation control may also be provided. In one embodiment, the cache threshold size designation control is configured to receive a user designation of the threshold size of the data cache, such that the data is automatically cleared from the data cache when the threshold size is reached.

In another aspect of the invention, a method of locally caching query explain data received across a network from a database system is provided and includes a step of requesting by a query explain program operating on a first computer.station, query explain data from the database system hosted at a second computer station. The method may also comprise receiving the query explain data from the database system over the network and temporarily storing the query explain data received from the database system over the network in a data cache local to the query explain program.

In one embodiment, the second computer station comprises a server, the first computer station comprises a workstation attached to the server, and the data cache is an integral component of the query explain program. The method may also comprise providing within the query explain program a user-enabled control for enabling or disabling the data cache.

The method may also comprise providing a graphical user interface (GUI) window accessible to a user from the query explain program. Preferably, the GUI window is configured to be displayed on an output device connected to the first computer station. The method may also comprise providing user controls within the GUI window for configuring the data cache.

In a further embodiment, providing a GUI window further comprises providing a cache size display within the GUI window. Preferably, the cache size display is configured to display for a user the current amount of data in the data cache. Providing the controls may further comprise providing a manual cache clearing control configured to allow a user to manually clear data from the data cache.

The method may further comprise automatically clearing the data cache when the data cache reaches a selected size. Accordingly, providing the controls may comprise providing a cache threshold size designation control configured to receive a user designation of the selected size of the data cache, such that data from the data cache is automatically cleared when the data cache reaches the selected size. The method may thus comprise receiving a user designation of the selected size and automatically clearing a user-selectable portion of the data cache when the data cache reaches the selected size.

The method may also comprise clearing a user-selectable portion of the data cache when the data cache reaches a selected size. Clearing a user-selectable portion may comprise clearing the least recently used query explain data from the data cache.

In yet another aspect of the invention, an article of manufacture comprises a program storage medium readable by a processor and embodying one or more instructions executable by the processor to perform the above-described method of locally caching query explain data received across a network from a database system.

These and other objects, features, and advantages of the present invention will become more fully apparent from the following description and appended claims, or may be learned by the practice of the invention as set forth in the following specification.

BRIEF DESCRIPTION OF THE DRAWINGS

These and other more detailed and specific objects and features of the present invention are more fully disclosed in the following specification, reference being had to the accompanying drawings, in which:

FIG. 5 is an illustration of a graphical representation of an access path according to one embodiment of the invention.

DETAILED DESCRIPTION OF THE PREFERRED EMBODIMENTS

The preferred embodiments of the present invention will be best understood by reference to the drawings, wherein like parts are designated by like numerals throughout. It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in the Figures, is not intended to limit the scope of the invention, as claimed, but is merely representative of presently preferred embodiments of the invention.

The Figures include schematic block diagrams and flow chart diagrams which illustrate in more detail the preferred embodiments of the present invention. The schematic block diagrams illustrate certain embodiments of modules for performing various functions of the present invention. In general, the represented modules include therein executable and operational data for operation within a computer system of FIG. 1 in accordance with the present invention.

As used herein, the term executable data, or merely an "executable," is intended to include any type of computer instructions and computer executable code that may be located within a memory device and/or transmitted as electronic signals over a system bus or network. An identified module of executable-code may, for instance, comprise one or more physical or logical blocks of computer instructions which may, for instance, be organized as an object, procedure, or function. Nevertheless, the executables of an identified module need not be located together, but may comprise disparate instructions stored in different locations which together comprise the module and achieve the purpose stated for the module. Indeed, an executable may be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may at least partially exist merely as electronic signals on a system bus or network.

Figure 1:
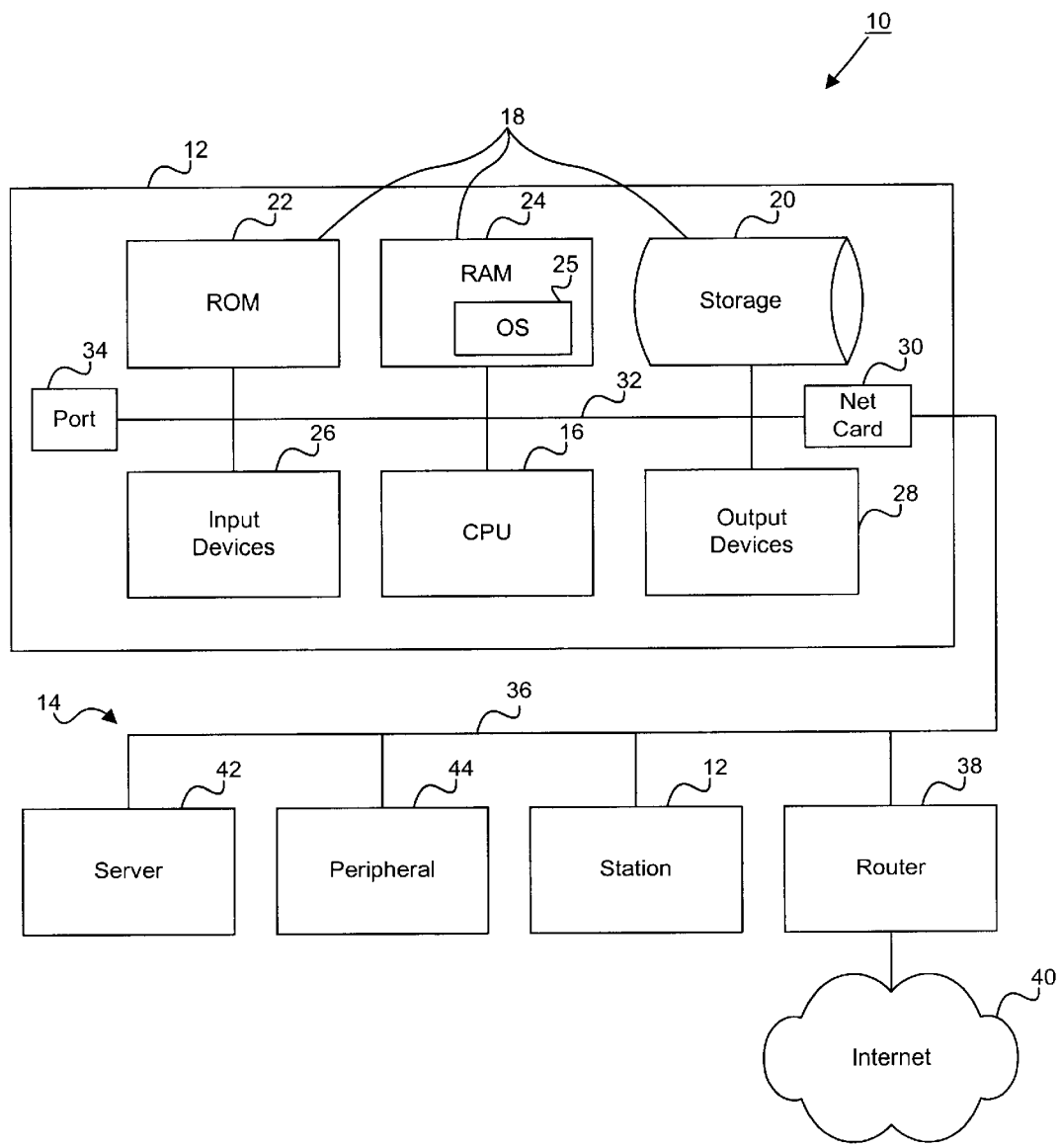
FIG. 1 is a schematic block diagram of a computer system suitable for implementing one embodiment of the invention.

FIG. 1 is a schematic block diagram that illustrates a computer system 10 in which executable and operational data, operating in accordance with the present invention, may be hosted on one or more computer stations 12 in a network 14. The network 14 may comprise a wide area network (WAN) or local area network (LAN) and may also comprise an interconnected system of networks, one particular example of which is the Internet and the World Wide Web supported on the Internet.

A typical computer station 12 may include a processor or CPU 16. The CPU 16 may be operably connected to one or more memory devices 18. The memory devices, 18 are depicted as including a non-volatile storage device 20 such as a hard disk drive or CD-ROM drive, a read-only memory (ROM) 22, and a random access volatile memory (RAM) 24. Preferably, the computer station 12 operates under the control of an operating system (OS) 25, such as MVS®, OS/390®, AIM®, OS/2®, WINDOWS NT®, WINDOWS®, UNIX®, and the like.

The computer station 12 or system 10 in general may also include one or more input devices 26, such as a mouse or keyboard, for receiving inputs from a user or from another device. Similarly, one or more output devices 28, such as a monitor or printer, may be provided within or be accessible from the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Within any given station 12, a system bus 32 may operably interconnect the CPU 16, the memory devices 18, the input devices 26, the output devices 28, the network card 30, and one or more additional ports 34. The system bus 32 and a network backbone 36 may be regarded as data carriers. As such, the system bus 32 and the network backbone 36 may be embodied in numerous configurations. For instance, wire, fiber optic line, wireless electromagnetic communications by visible light, infrared, and radio frequencies may be implemented as appropriate.

In general, the network 14 may comprise a single local area network (LAN), a wide area network (WAN), several adjoining networks, an Intranet, or as in the manner depicted, a system of interconnected networks such as the Internet 40. The individual stations 12 communicate with each other over the backbone 36 and/or over the Internet 40 with varying degrees and types of communication capabilities and logic capability. The individual stations 12 may include a mainframe computer on which the modules of the present invention may be hosted.

Different communication protocols, e.g., ISO/OSI, IPx, TCP/IP, may be used on the network, but in the case of the Internet, a single, layered communications protocol (TCP/IP) generally enables communications between the differing networks 14 and stations 12. Thus, a communication link may exist, in general, between any of the stations 12.

The stations 12 connected on the network 14 may comprise application servers 42, and/or other resources or peripherals 44, such as printers and scanners. Other networks may be in communication.with the network 14 through a router 38 and/or over the Internet 40.

Figure 2:
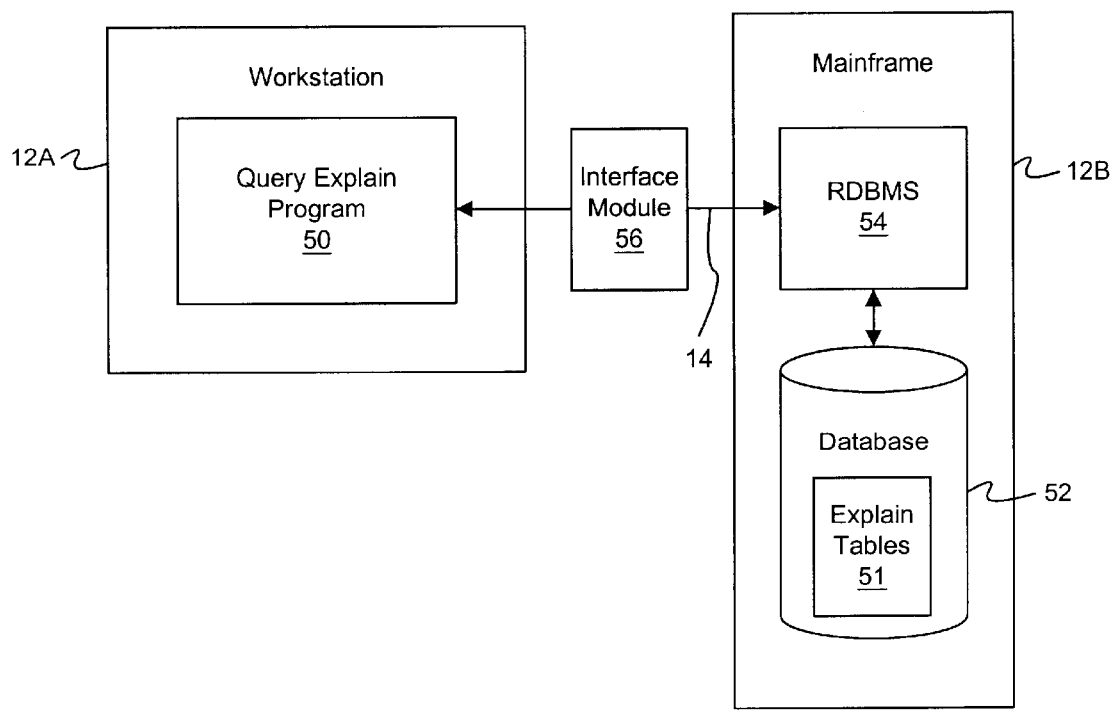
FIG. 2 is a schematic block diagram of a system for filtering explain tables according to one embodiment of the invention.

Referring now to FIG. 2, a schematic block diagram of one embodiment of the invention includes first and second computer stations 12A, 12B. The first computer station 12A is preferably a workstation-class computer, such as a PC™ workstation, available from IBM Corporation. The second computer station 12B is preferably an IBM mainframe computer operating under MVS® or OS/390®. In one embodiment, the stations 12A, 12B are coupled via a network 14 using a distributed remote data architecture (DRDA). Those skilled in the art, however, will recognize that the invention may be implemented using a variety of computing platforms and/or network architectures.

In one embodiment, the first computer station 12A includes a query explain program 50, which is a tool that assists a user in visualizing or otherwise understanding explain data for one or more queries. In one embodiment, the explain data is stored in one or more explain tables 51, which, as described hereafter, may include a plan table, a statement table, and a function table.

The second station 12B preferably stores the database 52, as well as a database system for managing the database 52. In the depicted embodiment, the database system comprises an RDBMS 54, one example of which is DB2® for OS/390®, available from IBM. Of course, other types of database systems could be used as well, such as hierarchical database systems, one example of which is IBM's IMS®. As used herein, the term "database" may generically refer to a combination of the database system (e.g., RDBMS 54) and the database 52. In one embodiment, the query explain program 50 and the database system are linked via an interface module 56, such as DB2 Connect®, also available from IBM.

Figure 3:
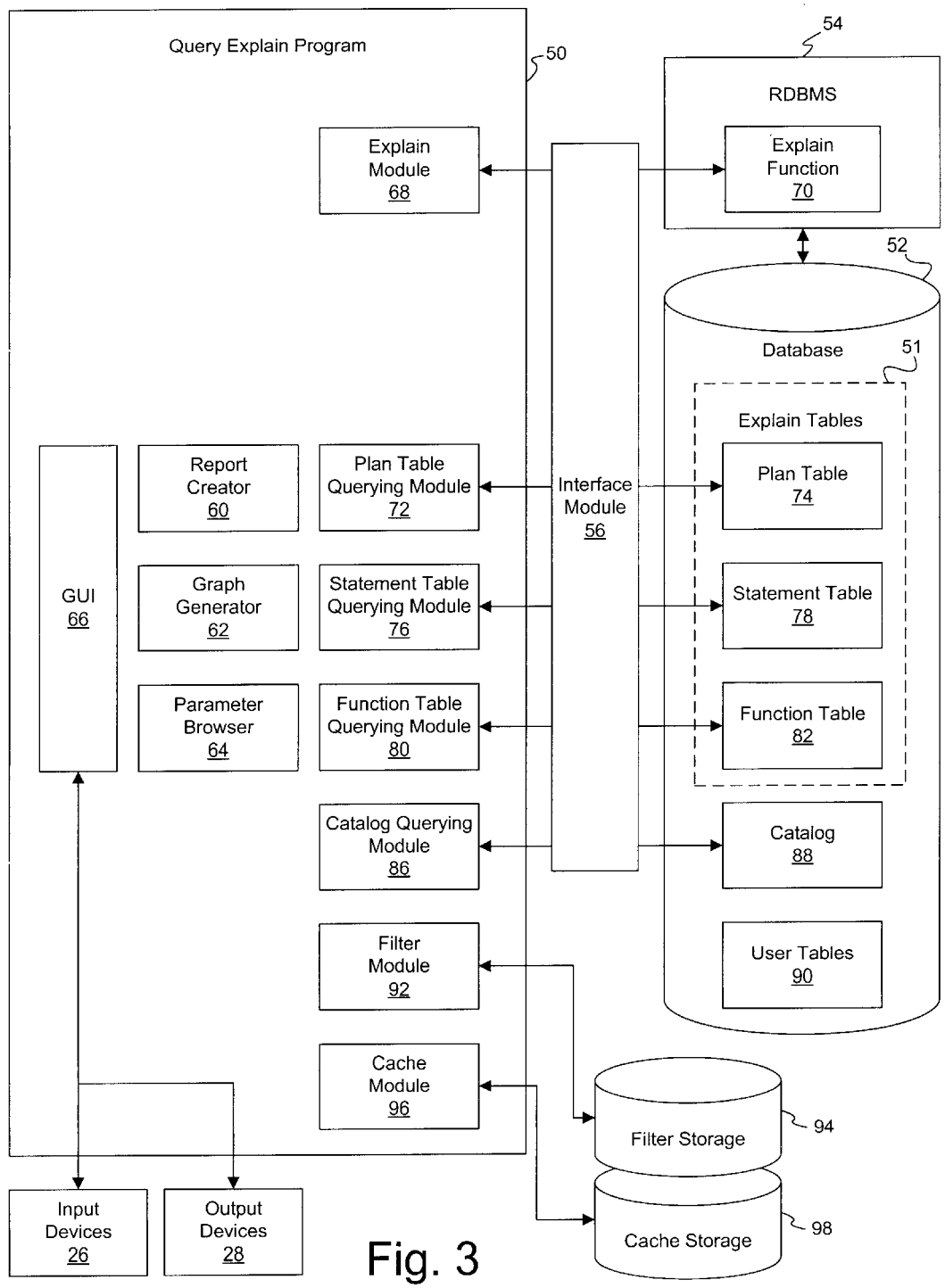
FIG. 3 is a schematic block diagram of a query explain program according to one embodiment of the invention.

Referring now to FIG. 3, the query explain program 50 preferably includes a plurality of modules containing executable and operational data suitable for operation within the memory devices 18 of FIG. 1. Of course, the memory devices 18 in which the modules of the present invention are located may also be distributed across both local and remote computer stations 12. Likewise, two or more illustrated modules may be integrated into a single module, or the function of a single module could be performed by a group of modules, without departing from the scope of the invention.

In one embodiment, the principle components of the query explain program 50 include a report creator 60, a graph generator 62, and a parameter browser 64. The above-described modules are, in one embodiment, intended to help the user to better understand the explain data, the subsystem parameters, and the like in a variety of ways.

For example, the report creator 60 may be configured to selectively prepare a report of the explain data in an easily understood, text-based format. The user may be provided with the option of selecting one or more query statements, as well as subsets of the explain data for the selected query statements to include in the report. The report preferably provides the user with the requested explain data in a centralized and readily understood format, allowing the user to efficiently analyze and improve SQL query performance. One example of the report creator 60 is more fully described in co-pending U.S. application Ser. No. 09/482,595 filed Jan. 13, 2000, U.S. Pat. No. 6,195,653 using Express Mail Label EL409135377US, for "System and Method for Selectively Preparing Customized Reports of Query Explain Data," which is commonly assigned and is incorporated herein by reference.

A further component of the query explain program 50 may comprise a graph generator 62, which is preferably configured to prepare a graphical representation of the access path of a query statement. One example of the graph generator 62 is more fully described in co-pending application Ser. No. 08/949,636, filed Oct. 14, 1997, for "Interpreting Data Using a Graphical User Interface," which is incorporated herein by reference.

Figure 4:
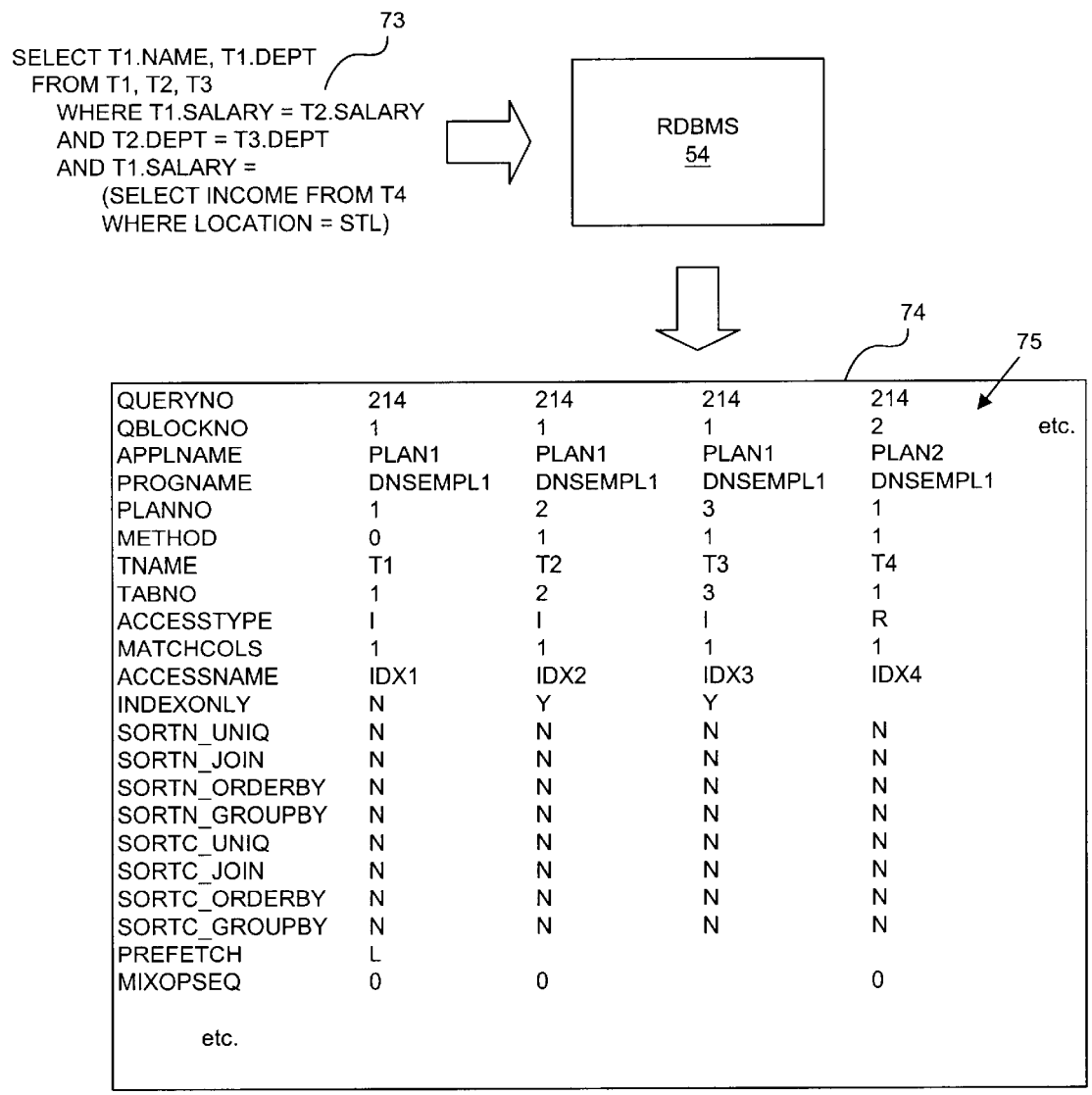
FIG. 4 is an illustration of a query statement and a portion of a plan table according to one embodiment of the invention.

FIG. 4 illustrates an exemplary SQL.query statement 73. The Query statement of FIG. 4 is shown converted by an RDBMS 54 into access path data 75 and stored within a plan table according to one embodiment of the present invention.

As shown in FIG. 5, the graph generator 62 in one embodiment uses data received from the plan table to generate a graphical representation of the access path. Preferably, access path steps of an SQL statement are graphically represented as nodes within a tree-like structure. Tables, indexes, and operations are graphically represented with unique symbols that indicate the item being represented. For example, rectangles represent tables, triangles represent indexes, and octagons represent operations such as table space scans, index scans, joins, etc. The graphical representation shows the relationship between the database objects and the operations. When the user selects a node of the graphical representation, detailed information related to the selected node is displayed on the right side of the display.

Referring again to FIG. 3, a third principal component of the query explain program 50 is the parameter browser 64. Preferably, the parameter browser 64 allows a user to selectively view the subsystem parameters (DSNZPARM and DSNHDECP values) used by a subsystem, as well as the install panels and fields. Access to subsystem parameters:is useful in debugging query statements. Like the graph generator 62, the parameter browser 64 is more fully described in co-pending application Ser. No. 08/949,636, filed Oct. 14, 1997, for "Interpreting Data Using a Graphical User Interface."

The report creator 60, graph generator 62, and parameter browser 64 are each preferably coupled to a graphical user interface (GUI) module 66. Preferably, the GUI module 66 is operably coupled to the input and output devices 26, 28 to allow the , user to interact with the report creator 60, graph generator 62, and parameter browser 64.

The query explain program 50 in the depicted embodiment also includes a dynamic explain module 68, which invokes a corresponding explain function 70 in the RDBMS 54. When invoked, the explain function 70 causes the RDBMS 54 to dynamically generate explain tables 51 for one or more explainable query statements.

In one embodiment, the explain tables 51 includes subsets of query explain data for the explainable query statements. The query explain data preferably indicates how the RDBMS 54 will execute the query statements. For instance, in one embodiment, the explain tables 51 include a plan table 74 for storing access path data, a statement table 78 for storing statement cost data, and a function table 82 for storing data related to user-defined functions. The precise names of the tables are not relevant, and other tables including the same information are within the scope of the present invention.

Preferably, the explainable query statements include the SELECT (except SELECT INTO) and INSERT statements, and the searched form of the UPDATE and the DELETE statements. The dynamic explain module 68 is used to invoke an explain function 70 in which the RDBMS 54 immediately generates explain data for a specific SQL statement. This feature is useful for interactively testing specified SQL statements. Alternatively, the RDBMS 54 generates the explain data at bind time in the context of an application or package upon encountering an EXPLAIN (YES) option of the BIND command.

In one embodiment, the query explain program 50 includes a plurality of querying modules for querying various tables in the database 52. For example, a plan table querying module 72 queries a plan table 74 to obtain access path data. Likewise, a statement table querying module 76 queries a statement table 78 to obtain statement cost data. A function table querying module 80 queries a function table 82 to obtain data concerning user-defined functions. Finally, a catalog querying module 86 queries the RDBMS catalog 88 to obtain object statistics for one or more database objects contained within in a plurality of user tables 90.

In one embodiment, the above-described modules use the interface module 56 when communicating with the RDBMS 54 and database 52. Although the querying function is implemented herein by four separate modules; those skilled in the art will recognize that the described functionality may be implemented by fewer modules.

Preferably, the query explain program 50 also includes a filter module 92. In one embodiment, the filter module 92 allows a user to filter a list of explainable query statements according to various user-selected criteria, including statement costs, references to particular database objects, and the inclusion of particular steps in the access paths of the statements. Moreover, in one embodiment, the user may assign a name to a set of filtering criteria and save the named set of criteria to, and retrieve the set from, a filter storage 94.

In one embodiment, the filter module 92 also allows a user to filter the explain tables 51 themselves according to user-defined filters. In one embodiment, the filters are directed to data within one or more user-specified columns in the explain tables 51 and are used to selectively exclude rows of the tables 51 that do not satisfy the user-specified filtering criteria.

The query explain program 50 also preferably includes a data cache. In the depicted embodiment, the data cache comprises a cache storage 98 which is managed by a cache module 96. Preferably, the cache module 96 temporarily stores portions of the above-described explain data 51. The contents of the explain tables 51 as well as any other data which might be accumulated by the database system for use in explaining access path and query servicing information to a user is referred to herein as explain data 51. Preferably, the explain data is stored by the cache module 96 in a cache storage 98.

The cache storage 98 may comprise a buffer or portion of physical or virtual memory that is set aside for caching. In one embodiment, the cache storage 98 is merely a data structure recognized by the cache module 96 that has a given size and is stored on the local hard disk drive 20 of the computer station 12 on which the query explain program 50 operates. Of course, any type of temporary data storage arrangement could be used, though it is preferred that the explain data 51 is stored local to the computer.station 12.

Figure 6:
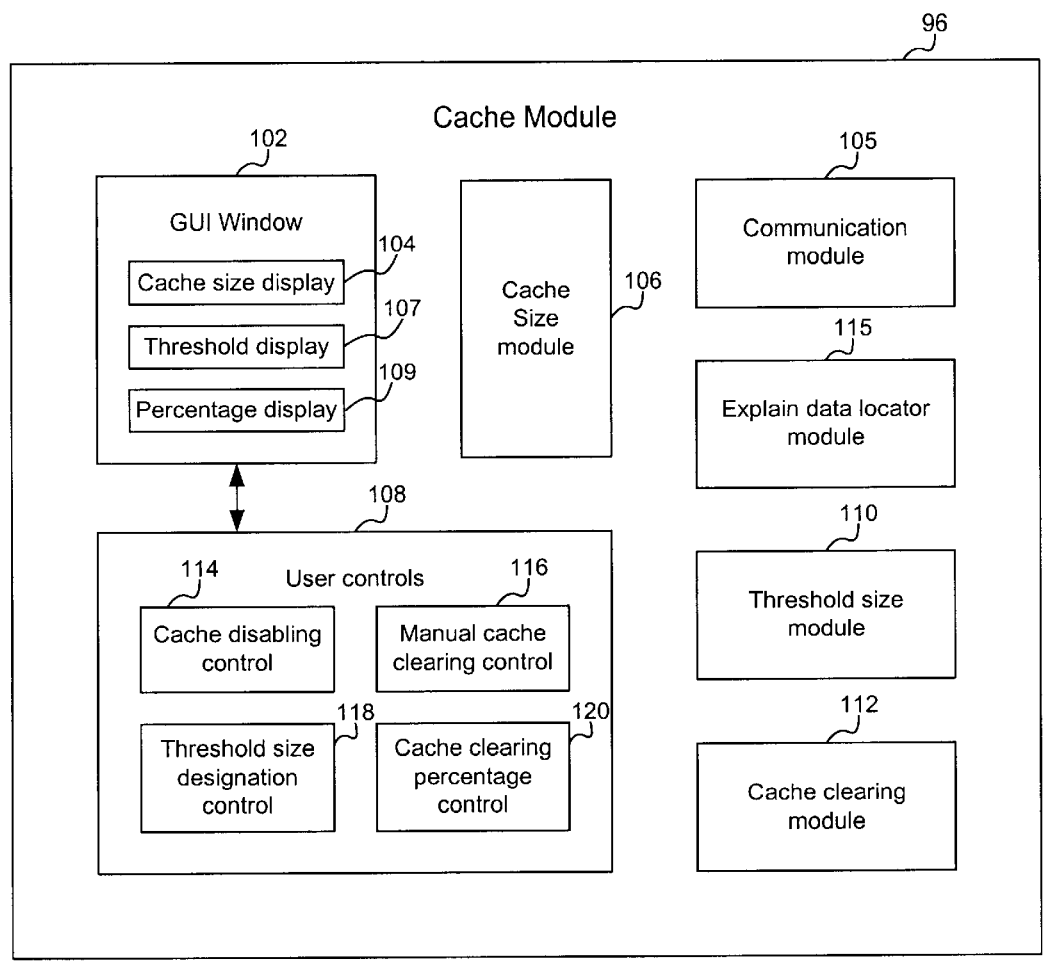
FIG. 6 is a schematic block diagram of a cache module according to one embodiment of the invention.

FIG. 6 shows one embodiment of the cache module 96. The cache module 96 is, in the depicted embodiment, configured to coordinate the local storage of explain data 51 received from the database system (e.g., RDBMS 54). The cache module 96 may communicate with other modules, including with the filter storage 94 through a communication module 105. As discussed, the cache module 96 preferably stores the explain data 51 in the cache storage 98.

Figure 7:
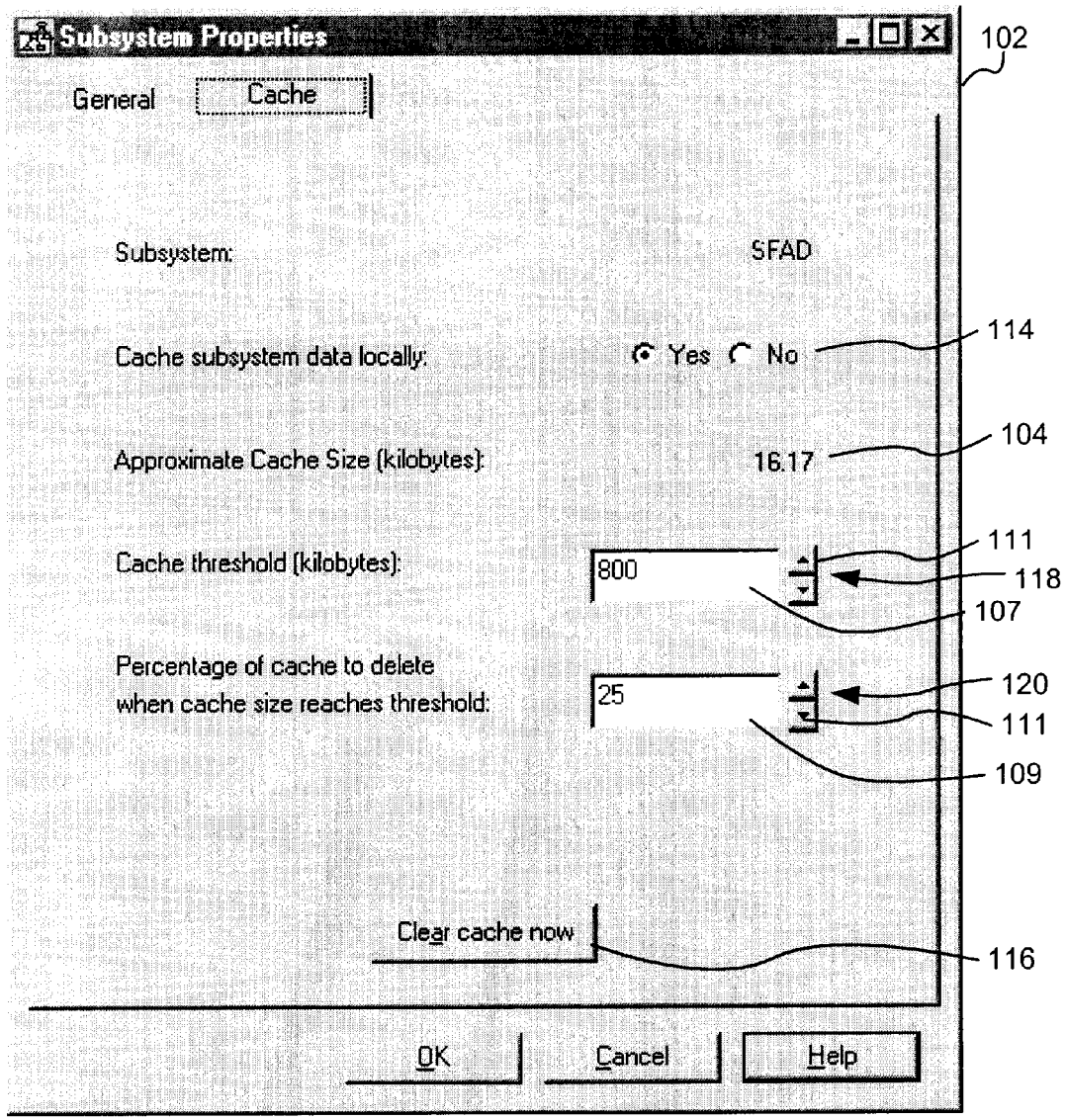
FIG. 7 is an illustration of an interactive display for configuring the cache module of FIG. 6 according to one embodiment of the invention.

The cache module 96 may also comprise a graphical user interface (GUI) window 102. Preferably, the GUI window 102 is displayed on an output device 28, such as a monitor screen, for viewing by a user. One example of the appearance of a GUI window 102 is shown in FIG. 7.

Also contained within the cache module 96 may be a plurality of user controls 108. In the depicted embodiment, the user controls 108 comprise a cache disabling control 114, a manual cache clearing control 116, a threshold size designation control 118, and a cache clearing percentage designation control 120.

The cache module 96 is also depicted as including a cache size module 106. Preferably, the cache size module 106 is configured to calculate the amount of data stored within the cache storage 98. In the depicted embodiment, the cache size module 106 is updated with all changes to the cache size by the cache module 96. As depicted, the cache size module 106 is configured to display the current cache size within the GUI window 102 using a cache size display 104.

Additionally, a threshold size module 110 and a cache clearing module 112 may be included in the cache module 96. The cache clearing module 112 is preferably configured to automatically clear a portion of the cache storage 98 when the cache storage 98 reaches a selected size. The selected size may be selected in any manner, and may be a fixed size. Nevertheless, in a preferred embodiment, the selected size may be configured by a user with the use of the threshold size module 110. The selected size is preferably received from a user through the threshold size designation control 118. The selected threshold size is preferably displayed in the GUI window 102 using a threshold display 107.

In the embodiment of FIG. 7, the threshold size designation control 118 comprise a text-entry box. Additionally, designators 11 may be used to decrease or increase the cache size in selected increments.

In addition, a cache clearing percentage designation control 120 may be used to select the amount of the cached explain data 51 to clear from the cache storage 94. Preferably, the cache clearing module 112 receives and stores the selected percentage of cached explain data 51 to clear. When the cache storage reaches the selected threshold size, the cache clearing module 112 clears or orders the cache storage 94 to clear the selected percentage of explain data 51 from the cache storage 98. Preferably, the selected percentage is displayed within the GUI window 102 by a percentage display 109.

The cache module 96 is also shown comprising an explain data locator module 115. The explain data locator module 115 is preferably configured to retrieve requested explain data 51 from the cache storage.

Thus, for example, when the plan table querying.module 72 retrieves explain data 51 from the plan table 74, the explain data 51 is preferably temporarily stored in the cache storage 94 when the cache is enabled. When future accesses to explain data 51 are requested, the function requesting the query data 51 may consult the plan table querying module 72, which in turn preferably consults the explain data locator module 115. The explain data locator module 115 in turn consults the cache storage 98, and if the explain data is stored therein, the explain data 51is accessed and passed to the requesting function. If the requested explain data 51 is not present, the plan table querying module 72 consults the explain tables 51 within the database 52 as discussed above.

Figure 8:
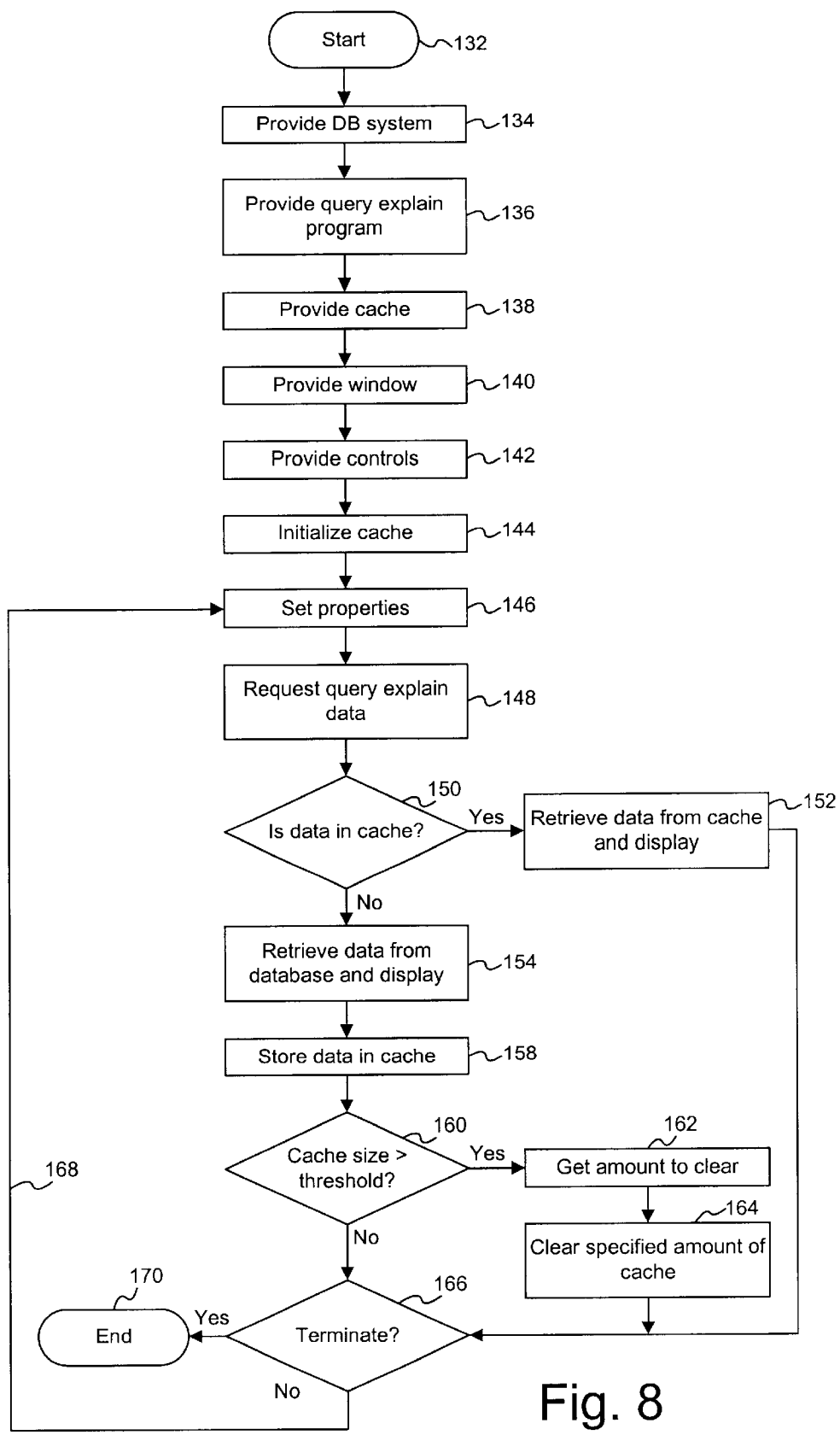
FIG. 8 is a schematic flow chart diagram of a method of locally caching query explain data.

FIG. 8 illustrates one embodiment of a method 130 of caching query explain data received across a network from a database. As illustrated, the method 130 begins at a step 132 and progresses to a step 134 in which a database system is provided. The database system in the depicted embodiments comprises the RDBMS 54, though any suitable database system could be used. Providing the database system may comprise coding or manufacturing the database system, and may also merely comprise purchasing the database system. Preferably, the database system is installed on a computer system 10, such as that shown in FIG. 1.

In a subsequent step 136, a query explain program 50 is provided. Preferably, the query explain program 50 is configured as described above, though any program which retrieves query explain data onto a workstation from a remote database system could be utilized. Providing the query explain program may comprise coding or manufacturing the query explain program, and may also merely comprise purchasing the query explain program. Preferably, the query explain program 50 is loaded onto a workstation 12 operating on a common network 14 with a server 42 containing the database system 54.

At a step 138, a data cache is provided. In one embodiment, the data cache comprises a cache storage 98. Preferably, the cache storage 98 is provided within a common workstation 12 on which the query explain program 50 is operating. More preferably, the cache storage 98 is stored on a common hard disk drive with the query explain program 50 and managed as a data structure by the cache module 96. Thus, the cache storage 98 may be integral to the query explain program 50.

At a step 140, a GUI window 102 is provided. Preferably, the GUI window 102 is configured as described above and may appear in the manner given by way of example in FIG. 7. At a step 142, controls are provided. Preferably, the controls comprise the user controls 108 of FIG. 6.

At a step 144, storage is allocated for the data cache. In one embodiment this comprises initializing the query explain program 50. In an alternative embodiment, the storage is allocated as the data is received. At a step 146, properties of query explain program are set by a user (or by default). Preferably, the properties are set by a user, and preferably include the setting of the threshold size of the data cache at which the cache module 96 clears the data cache. In the depicted embodiment, the user utilizes the threshold size designation control 118 as described above. In addition, a user may set the amount of query explain data 51 within the data cache that is automatically cleared. This may be set by a user with the cache clearing percentage designation control 120 as described above.

At a step 148, a need for query explain data 51 is registered by the query explain program. Typically, a function of the query explain program 50, examples of which are described above is executed. The function registers a need for and requests query explain data 51 from the database system 54.

At a step 150, a determination is made whether the requested data is in the cache storage 98. If so, at a step 152, the explain data 51 is retrieved from the cache storage 98 and displayed to the user. If, however, the explain data 51 is not in the cache storage 98, the explain data 51 is retrieved from the database 52, at a step 154, and displayed to the user, after which the explain data 54 is stored in the cache storage .98,- at a step 158.

At a step 160, a determination is made whether the size of the cached explain data in the cache storage 98 exceeds a specified threshold, as specified, for example, by the threshold size designation control 118. If the size exceeds the threshold, the amount (e.g. percentage) by which the cache storage 98 should be cleared is obtained in a step 162. In one embodiment, the amount is user-specified by means of the cache clearing percentage designation control 120. Thereafter, the cache storage 98 is cleared by the specified amount in a step 164.

At step 166, the method determines whether to terminate. The cache module typically terminates when the query execution program terminates. If the program is to be terminated, at a step 170 the method 130 ends. If the program is not terminated, the method preferably loops 168 back to step 148 where further query explain data is requested.

The method and apparatus of the present invention for locally caching query explain data received across a network provides several advantages over the prior art. Typically, receipt of query explain data will be expedited. In addition, a user may work off-line from the network within the query execution program 50, analyzing query explain data 51 stored in the cache storage. Additionally, traffic on the database system can be reduced.

What is claimed and desired to be secured by United States Letters Patent is:

1. An apparatus for locally caching query explain data received across a network from a database system, the apparatus comprising:
 a query explain program configured to operate on a first computer station communicating over a network with a second computer station hosting the database system, the query explain program further.configured to receive query explain data from the database system over the network, the query explain program further configured to present the query explain data to a user;
 a data cache residing on the first computer station and communicating with the query explain program, the data cache configured to receive and temporarily store the query execution data received from the database system over the network; and
 a plurality of user controls configured to provide operational control of the data cache to the user.

2. The apparatus of claim 1, wherein the data cache is an integral component of the query explain program and temporarily stores exclusively query explain data received across the network from the database system.

3. The apparatus of claim 1, wherein the second computer station comprises a server and the first computer station comprises a workstation attached to the server.

4. The apparatus of claim 1, further comprising a user-enabled control within the query explain program for enabling or disabling the data cache.

5. The apparatus of claim 1, further comprising a graphical user interface (GUI) window accessible through the query explain program, the GUI window configured to be displayed on an output device connected to the first computer station and comprising user controls for configuring the data cache.

6. The apparatus of claim 5, wherein the GUI window further comprises a cache size display configured to display the current amount of data stored in the data cache.

7. The apparatus of claim 5, wherein the controls comprise a manual cache clearing control configured to allow a user to manually clear data from the data cache.

8. The apparatus of claim 5, further comprising a cache clearing module configured to automatically clear data from the data cache when the data cache reaches a certain size, and wherein the controls comprise a cache threshold size designation control configured to receive a user designation of the threshold size of the data cache, such that the data is automatically cleared from the data cache when the threshold size is reached.

9. The apparatus of claim 5, further comprising a cache clearing module configured to automatically clear data from the data cache when the data cache reaches a selected size, the cache clearing module configured to clear a user-selectable portion of the data cache when the data cache reaches the selected size, and wherein the controls comprise a cache clearing percentage designation module configured to receive a user selection of a percentage of the data cache to automatically clear when the data cache reaches the selected size.

10. The apparatus of claim 1, further comprising a cache clearing.module configured to automatically clear data from the data cache when the data cache reaches a selected size.

11. The apparatus of claim 10, wherein the cache clearing module is configured to clear a user-selectable portion of the data cache when the data cache reaches the selected size.

12. The apparatus of claim 10, wherein the cache clearing module is configured to clear the least recently used query explain data from the data cache.

13. The apparatus of claim 1, wherein the query explain data is selected from the group consisting of plan table data, function table data, and statement table data, database object statistics, and SQL text for a given statement.

14. The apparatus of claim 1, wherein the query explain program is configured to initially consult the data cache when in need of selected query explain data and if the selected query explain data is not found in the data cache, to subsequently consult the database system at the second computer station for the selected query explain data.

15. An apparatus for locally caching query explain data received across.a network from a database system, the apparatus comprising:
 a query explain program configured to operate on a workstation communicating over a network with a server hosting the database system, the query explain program further configured to receive query explain data from the database system over the network; and
 a data cache residing on the first computer station and communicating with the query explain program, the data cache executable as an integral component of the query explain program and configured to receive and temporarily store exclusively the query explain data received from the database system over the network;
 a graphical user interface (GUI) window accessible through the query explain program, the GUI window configured to be displayed on an output device connected to the first computer station and comprising user controls for configuring the data cache, the GUI window further comprising a cache size display configured to display the current amount of data stored in the data cache and a manual cache clearing control configured to allow a user to manually clear the data from the data cache;

a cache clearing module configured to automatically clear a user-selectable portion of data from the data cache when the data cache reaches a selected size; and a cache threshold size designation control configured to receive a user designation of the threshold size of the data cache, such that the data is automatically cleared from the data cache when the threshold size is reached.

16. A method of locally caching query execution data received across a network from a database system, the method comprising:

requesting by a query explain program operating on a first computer station, query explain data from the database system hosted at a second computer station;

receiving the query execution data from the database system over the network;

presenting the query explain data to a user;

temporarily storing the query execution data received from the database system over the network in a data cache local to the query explain program; and providing a plurality of user controls to a user that provide operational control of the data cache.

17. The method of claim 16, wherein the second computer station comprises a server, the first computer station comprises a workstation attached to the server, and the data cache is an integral component of the query explain program.

18. The method of claim 16, further comprising providing within the query explain program a user-enabled control for enabling or disabling the data cache.

19. The method of claim 16, further comprising providing a graphical user interface (GUI) window accessible to a user from the query explain program and configured to be displayed on an output device connected to the first computer station, the method also comprising providing user controls within the GUI window for configuring the data cache.

20. The method of claim 19, wherein providing a GUI window further comprises providing a cache size display within the GUI window, the cache size display configured to display for a user the current amount of data in the data cache.

21. The method of claim 16, further comprising providing a manual cache clearing control configured to allow a user to manually clear data from the data cache.

22. The method of claim 21, further comprising automatically clearing the data cache when the data cache reaches a selected size.

23. The method of claim 16, further comprising providing a cache threshold size designation control configured to receive a user designation of the selected size of the data cache, such that data from the data cache is automatically cleared when the data cache reaches the selected size.

24. The method.of claim 16, further comprising automatically clearing a user-selectable portion of the data cache when the data cache reaches the selected size.

25. The method of claim 24, further comprising receiving a user designation of the selected size.

26. The method of claim 24, wherein clearing a user-selectable portion of the data cache when the data cache reaches a selected size comprises clearing the least recently used query explain data from the data cache.

27. The method of claim 16, further comprising providing a cache clearing module, the cache clearing module configured to clear a user-selectable portion of the data cache when the data cache reaches the selected size, and further comprising providing a cache clearing percentage designation module configured to receive a user selection of a percentage of the data cache to automatically clear when the data cache reaches the selected size.

28. The method of claim 16, wherein receiving the query explain data comprises receiving data selected from the group consisting of plan table data, function table data, and statement table data, database object statistics, and SQL text for a given statement.

29. The method of claim 16, further comprising the query explain program registering a need for query explain data and initially consulting the data cache for the query explain data and thereafter consulting the database system at the second computer station.

30. An article of manufacture comprising a program storage medium readable by a processor and embodying one or more instructions executable by the processor to perform a method of locally caching query explain data received across a network from a database system, the method comprising:

requesting by a query explain program operating on a first computer station, query explain data to be sent from the database system hosted at a second computer station;

receiving the query explain data from the database system over the network;

presenting the query explain data to a user;

temporarily storing the query explain data received from the database system over the network local to the query explain program; and providing a plurality of user controls to a user that provide operational control of the data cache.

31. The article of manufacture of claim 30, wherein the second computer station comprises a server and the first computer station comprises a workstation attached to the server.

32. The article of manufacture of claim 30, further comprising providing within the query explain program a user-enabled control for enabling or disabling the data cache.

33. The article of manufacture of claim 30, further comprising providing a graphical user interface (GUI) window accessible from the query explain program and configured to be displayed on an output device connected to the first computer station and comprising providing user controls within the GUI window for configuring the data cache.

34. The article of manufacture of claim 33, wherein providing the GUI window further comprises providing a cache size display configured to display to a user the current amount of data stored in the data cache.

35. The article of manufacture of claim 34, wherein providing the controls comprises providing a manual cache clearing control.

36. The article of manufacture of claim 33, wherein the providing the controls comprises providing a cache threshold size designation control configured to receive a user designation of the selected size of the data cache, such that the data cache is automatically cleared when the threshold size is reached.

37. The article of manufacture of claim 30, further comprising automatically clearing the data cache when the data cache reaches a selected size.

38. The article of manufacture of claim 30, further comprising automatically clearing a user-selectable portion of the data cache when the data cache reaches the selected size.

39. The article of manufacture of claim 38, further comprising a receiving a user designation of the selected size.

40. The article of manufacture of claim 38, wherein clearing a user-selectable portion of the data cache when the data cache reaches a selected size comprises clearing the least recently used query explain data from the data cache.

41. The article of manufacture of claim 30, further comprising providing a cache clearing module accessible from the data explain program and configured to clear a user-selectable portion of the data cache when the data cache reaches a selected size, and further comprising providing a cache clearing percentage designation module configured to receive a user selection of a percentage of the data cache to automatically clear when the data cache reaches the selected size.

42. The article of manufacture of claim 30, wherein receiving the query explain data comprises receiving data selected from the group consisting of plan table data, function table data, statement table data, database object statistics, and SQL text for a given statement.

43. The article of manufacture of claim 30, further comprising the query explain program registering a need for query explain data and first consulting the data cache for the query explain data and thereafter consulting the database system at the second computer station.

* * * * *

UNITED STATES PATENT AND TRADEMARK OFFICE
CERTIFICATE OF CORRECTION

PATENT NO.     : 6,604,096 B1
DATED          : August 5, 2003
INVENTOR(S)    : Couch et al.

It is certified that error appears in the above-identified patent and that said Letters Patent is hereby corrected as shown below:

<u>Drawings,</u>
Figure 8 should be collectively labeled 130.
Figure 8, Loop 168 should connect to box 148.

<u>Column 2,</u>
Line 12, ""function - table."" should read -- "function table" --.

<u>Column 3,</u>
Line 22, "computer.station," should read -- computer station, --.

<u>Column 5,</u>
Line 29, "devices, 18" should read -- devices 18 --.

<u>Column 6,</u>
Line 12, "communication. with" should read -- communication with --.

<u>Column 7,</u>
Line 21, "SQL. query" should read -- SQL query --.
Line 44, "parameters:is" should read -- parameters is --.
Line 54, "the , user" should read -- the user --.

<u>Column 8,</u>
Line 28, "within in a" should read -- within a --.
Line 32, "modules;" should read -- modules, --.

<u>Column 9,</u>
Line 4, "computer.station 12" should read -- computer station 12 --.
Line 45, "comprise" should read -- comprises --.
Line 46, "designators 11" should read -- designators 111 --.
Line 51, "cache storage 94." should read -- cache storage 98. --.
Lines 55 and 56, "cache storage 94" should read -- cache storage 98 --.
Line 64, "querying.module" should read -- querying module --.

<u>Column 10,</u>
Line 6, "51is" should read -- 51 is --.
Line 50, "of query" should read -- of the query --.
Line 63, "above is" should read -- above, is --.

UNITED STATES PATENT AND TRADEMARK OFFICE
CERTIFICATE OF CORRECTION

PATENT NO.   : 6,604,096 B1
DATED        : August 5, 2003
INVENTOR(S)  : Couch et al.

It is certified that error appears in the above-identified patent and that said Letters Patent is hereby corrected as shown below:

<u>Column 11,</u>
Line 5, "explain data 54" should read -- explain data 51 --.
Line 6, "-98,-" should read -- 98, --.
Line 41, "further.configured" should read -- further configured --.

<u>Column 12,</u>
Line 26, "clearing.module" should read -- clearing module --.
Line 45, "across.a" should read -- across a --.

<u>Column 13,</u>
Line 54, "method.of" should read -- method of --.

Signed and Sealed this

Thirtieth Day of December, 2003

JAMES E. ROGAN
*Director of the United States Patent and Trademark Office*